United States Patent [19]

Spehrley, Jr.

[11] 4,305,529

[45] Dec. 15, 1981

[54] PARTICLE DISPENSING SYSTEM

[75] Inventor: Charles W. Spehrley, Jr., Lebanon, N.H.

[73] Assignee: Xerox Corporation, Stamford, Conn.

[21] Appl. No.: 104,225

[22] Filed: Dec. 17, 1979

[51] Int. Cl.[3] .............................................. G01F 11/24

[52] U.S. Cl. ............................. 222/228; 222/DIG. 1; 222/231; 222/412

[58] Field of Search ........................ 221/203, 233, 235; 222/228, 224, 225, 231, DIG. 1, 412

[56] References Cited

U.S. PATENT DOCUMENTS

| | | | |
|---|---|---|---|
| 1,851,044 | 3/1932 | Genovesi | 222/232 |
| 1,997,030 | 4/1935 | Allswede . | |
| 2,031,820 | 2/1936 | Crawford | 222/231 X |
| 2,152,500 | 3/1939 | Rasmussen | 222/225 |
| 3,224,649 | 12/1965 | Gunto | 222/224 X |
| 3,474,937 | 10/1969 | Frey | 222/231 X |
| 4,173,294 | 11/1979 | Savage | 222/DIG. 1 |

*Primary Examiner*—David A. Scherbel
*Attorney, Agent, or Firm*—H. Fleischer; H. M. Brownrout

[57] ABSTRACT

An apparatus in which particles are dispensed from the open end of a chamber. A member is positioned interiorly of the chamber and periodically agitated in response to particles being dispensed therefrom. Agitation of the member prevents bridging and caking of the particles in the chamber and facilitates the flow of the particles therefrom.

20 Claims, 6 Drawing Figures

PARTICLE DISPENSING SYSTEM

This invention relates generally to an electrophotographic printing machine, and more particularly concerns an improved particle dispensing system for use therein.

Generally, the process of electrophotographic printing includes charging a photoconductive member to a substantially uniform potential so as to sensitize the surface thereof. The charged portion of the photoconductive surface is exposed to a light image of an original document being reproduced. This records an electrostatic latent image on the photoconductive member corresponding to the informational areas contained within the original document. After the electrostatic latent image is recorded on the photoconductive member, the latent image is developed by bringing a developer material into contact therewith. This forms a powder image on the photoconductive member which is subsequently transferred to a copy sheet. Finally, the powder image is heated to permanently affix it to the copy sheet in image configuration.

A suitable developer material frequently comprises carrier granules having toner particles adhering triboelectrically thereto. This two component mixture is brought into contact with the photoconductive surface. The toner particles are attracted from the carrier granules to the latent image. Those toner particles adhering to the latent image form a powder image on the photoconductive surface.

Various methods have been devised for applying developer material to the latent image. For example, the developer material may be cascaded over the latent image with the toner particles being attracted from the carrier granules thereto. Other techniques utilize magnetic field producing devices which form brush-like tufts extending outwardly therefrom contacting the photoconductive surface. With the advent of single component developer materials, i.e. conductive magnetic particles, carrier granules are no longer required.

It is apparent that during the development cycle, toner particles or, the single component developer material, itself, is depleted from the developer material. Thus, additional particles must be furnished to maintain copy density at a substantially optimum level. In order to produce an efficient printing machine, it is necessary to conveniently and effectively replace the particles used during the formation of copies.

Hereinbefore, particles have been dispensed from a trough or hopper into the developer mix. Frequently, the particles within the hopper bridge or cake. This prevents the particles from flowing into the sump of the development system. When the system is low in particles, the printing machine produces light copies resulting in customer dissatisfaction.

Various approaches have been devised to prevent bridging and caking of particles within the hopper. The following disclosures appear to be relevant:

U.S. Pat. No. 1,997,030
Patentee: Allswede
Issued: Apr. 9, 1935
U.S. Pat. No. 3,224,649
Patentee: Gunto
Issued: Dec. 21, 1965

The relevant portions of the foregoing disclosures may be briefly summarized as follows:

Allswede describes an apparatus for scrubbing and treating gravel which includes a box mounted for agitation by a suitable shaker mechanism. The box is divided into compartments with each compartment including a plurality of balls adapted to crush objectionable material in the gravel. A screen extends across the bottom of the compartment. Muddy gravel is discharged into each compartment as the box is agitated. This causes the balls and the gravel to be thoroughly mixed. The crushing action of the balls breaks up the stones and clay lumps permitting the gravel to pass through the screen relatively easily.

Gunto discloses a developer unit which includes a powder feeding assembly. The powder feeding assembly includes a supply recepticle having a pair of downwardly inclined side walls defining an elongated bottom opening through which powder is discharged. A V-shaped trough is disposed below and in alignment with the bottom opening. The trough is mounted in an inclined position so that the lower end forms an outlet. A plurality of spheres are disposed in the opening resting on opposite side walls of the trough. The spheres substantially fill the opening being spaced slightly above the apex of the trough. These spheres tend to roll downwardly and bear against each other. The spheres are irregularly shaped quartz balls, or any other suitable material such as steel or ceramic substances. The trough is secured to a vibrator assembly. Energization of the vibrator assembly causes oscillation of the trough. Vibration of the trough moves the spheres to loosen the toner in the supply recepticle. This provides a flow of toner from the receptacle.

In accordance with the features of the present invention, there is provided an apparatus for dispensing particles. The apparatus includes means defining an open ended chamber, for storing a supply of particles therein. Means, disposed in the open end of the chamber, dispense particles therefrom. A member, positioned in the open end of the chamber, is periodically in engagement with the dispensing means. The member is agitated in response to the dispensing means discharging particles from the open end of the chamber. Agitation of the member prevents bridging and caking of the particles in the chamber facilitating the flow of particles therefrom.

Other aspects of the present invention will become apparent as the following description proceeds and upon reference to the drawings, in which.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
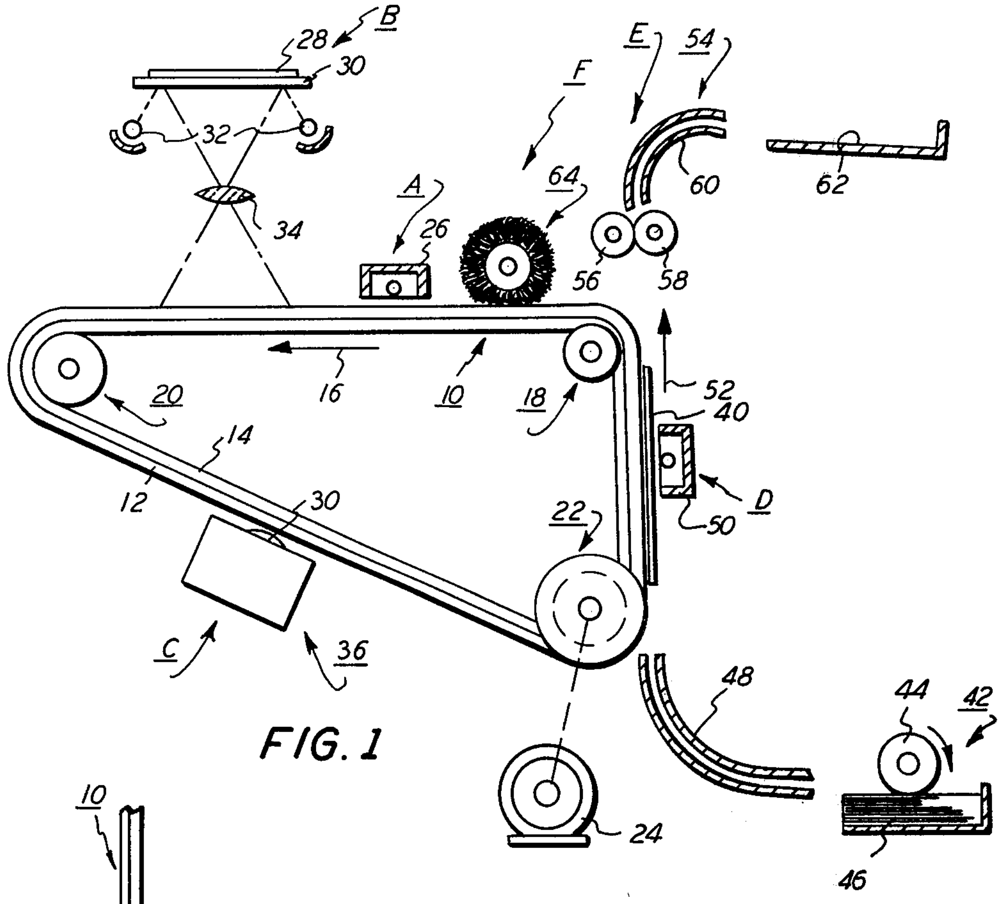
FIG. 1 illustrates a schematic elevational view of an electrophotographic printing machine incorporating the features of the present invention therein.

For a general understanding of the features of the present invention, reference is had to the drawings, in the drawings like reference numerals have been used throughout to designate identical elements. FIG. 1 schematically depicts the various components of an illustrative electrophotographic printing machine incorporating the particle dispensing apparatus of the present invention therein. It will become evident from the following discussion that this apparatus is equally well suited for use in a wide variety of electrostatographic printing machines and is not necessarily limited in its application to the particular embodiment depicted herein.

Inasmuch as the art of electrophotographic printing is well known, the various processing stations employed in the FIG. 1 printing machine will be shown hereinafter schematically and their operation described briefly with reference thereto.

Turning now to FIG. 1, the electrophotographic printing machine employs a belt 10 having a photoconductive surface 12 deposited on a conductive substrate 14. Preferably, photoconductive surface 12 comprises a transport layer containing small molecules of m-TDB dispersed in a polycarbonate and a generation layer of trigonal selenium. Conductive substrate 14 is made preferably from aluminized Mylar which is electrically grounded. Other suitable photoconductive surfaces and conductive substrates may also be employed. Belt 10 moves in the direction of arrow 16 to advance successive portions of photoconductive surface 12 through the various processing stations disposed about the path of movement thereof. As shown, belt 10 is entrained about a stripping roller 18, tension roller 20, and drive roller 22. Drive roller 22 is mounted rotatably and in engagement with belt 10. Motor 24 rotates roller 22 to advance belt 10 in the direction of arrow 16. Roller 22 is coupled to motor 24 by suitable means such as a drive belt. Drive roller 22 includes a pair of opposed spaced edge guides. The edge guides define a space therebetween which determines the desired path of movement of belt 10. Belt 10 is maintained in tension by a pair of springs (not shown) resiliently urging tension roller 20 against belt 10 with the desired spring force. Both stripping roller 18 and tension roller 20 are mounted rotatably. These rollers are idlers which rotate freely as belt 10 moves in the direction arrow 16.

With continued reference to FIG. 1, initially a portion of belt 10 passes through charging station A. At charging station A, a corona generating device indicated generally by the reference numeral 26, charges photoconductive surface 12 of belt 10 to a relatively high, substantially uniform potential.

Next, the charged portion of photoconductive surface 12 is advanced through exposure station B. At exposure station B, an original document 28 is positioned face-down upon a transparent platen 30. Lamps 32 flash light rays onto original document 28. The light rays reflected from original document 28 are transmitted through lens 34 forming a light image thereof. Lens 34 focuses the light image onto the charged portion of photoconductive surface 12 to selectively dissipate the charge thereon. This records an electrostatic latent image corresponding to the information areas contained within the original document on photoconductive surface 12. Thereafter, belt 10 advances the electrostatic latent image recorded on photoconductive surface 12 to development station C. At development station C, a magnetic brush development system, indicated generally by the reference numeral 36, transports a developer mixture of carrier granules and toner particles into contact with the photoconductive surface 12. Magnetic brush development system 36 includes a magnetic brush developer roller 38. Magnetic brush developer roller 38 advances the developer mixture into contact with photoconductive surface 12. The developer roller forms a brush comprising carrier granules and toner particles. The toner particles are attracted from the carrier granules to the electrostatic latent image forming a toner powder image on photoconductive surface 12 of belt 10. The detailed structure of the magnetic brush development system will be described hereinafter with reference to FIG. 2.

After development, belt 10 advances the toner powder image to transfer station D. At transfer station D, a sheet of support material 40 is moved into contact with the toner powder image. The sheet of support material is advanced to transfer station D by a sheet feeding apparatus 42. Preferably, sheet feeding apparatus 42 includes a feed roll 44 contacting the uppermost sheet of stack 46. Feed roll 44 rotates to advance the uppermost sheet from stack 46 into chute 48. Chute 48 directs the advancing sheet of support material into contact with photoconductive surface 12 of belt 10 in a timed sequence so that the toner powder image developed thereon contacts the advancing sheet of support material at transfer station D.

Transfer station D includes a corona generating device 50 which sprays ions onto the backside of sheet 40. This attracts the toner powder image from photoconductive surface 12 to sheet 40. After transfer, the sheet continues to move in the direction of arrow 52 onto a conveyor (not shown) which advances the sheet to fusing station E.

Fusing station E includes a fuser assembly, indicated generally by the reference numeral 54, which permanently affixes the transferred toner powder image to sheet 40. Preferably, fuser assembly 54 includes a heated fuser roll 56 and a back-up roll 58. Sheet 40 passes between fuser roll 56 and back-up roll 58 with the toner powder image contacting fuser roll 56. In this manner, the toner powder image is permanently affixed to sheet 40. After fusing, chute 60 guides the advancing sheet 40 to catch tray 62 for subsequent removal from the printing machine by the operator.

Figure 3:
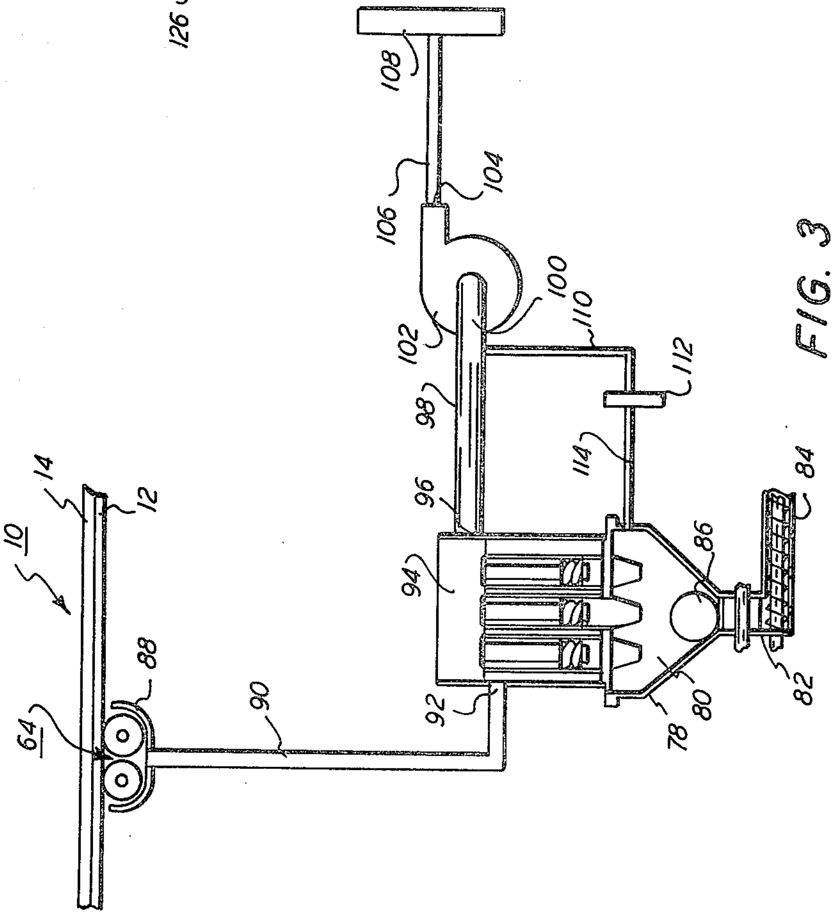
FIG. 3 depicts a schematic elevational view of a particle reclaiming and dispensing system employed with the FIG. 2 development system.

Invariably, after the sheet of support material is separated from photoconductive surface 12 of belt 10, some residual particles remain adhering thereto. These residual particles are removed from photoconductive surface 12 at cleaning station F. Cleaning station F includes a pre-clean corona generating device (not shown) and a rotatably mounted fiberous brush 64 in contact with photoconductive surface 12. The pre-clean corona generator neutralizes the charge attracting the particles to the photoconductive surface. These particles are then cleaned from photoconductive surface 12 by the rotation of brush 64 in contact therewith. The particles removed from photoconductive surface 12 pass through a reclamation system which separates the contaminants from the un-used toner particles. The unused toner particles are recirculated back to the development system for subsequent re-use. The detailed structure of the reclamation system is shown in FIG. 3. Subsequent to cleaning, a discharge lamp (not shown) floods photoconductive surface 12 with light to dissipate any residual charge remaining thereon prior to the charging thereof for the next successive image cycle.

It is believed that the foregoing description is sufficient for purposes of the present application to illustrate the general operation of an electrophotographic printing machine incorporating the features of the present invention therein.

Figure 2:
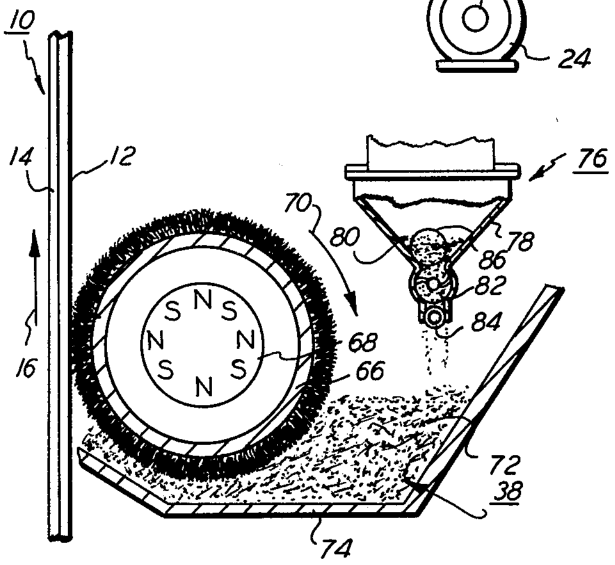
FIG. 2 shows a schematic elevational view of a development system used in FIG. 1 printing machine.

Referring now to FIG. 2, there is shown development system 36 in greater detail. As depicted thereat, development system 36 includes a developer roller 38 having a non-magnetic tubular member 66. An elongated magnetic member 68 is positioned interiorly of tubular member 66 and spaced from the interior periphery thereof. Tubular member 66 rotates in the direction of arrow 70 so as to advance the developer material into contact with the electrostatic latent image recorded on photoconductive surface 12 of belt 10. As tubular member 66 rotates in the direction of arrow 70, it passes through the sump of chamber 72 in housing 74. Developer material is disposed in the sump of chamber 72 and attracted to tubular member 66 via the magnetic field generated by elongated magnetic member 68. In this manner, the developer material is attracted to tubular member 66 and advances therewith, in the direction of arrow 70, into contact with the electrostatic latent image recorded on photoconductive surface 12 of belt 10. The electrostatic latent image attracts the toner particles from the developer material. Thus, toner particles are being continually depleted from the developer material. If additional toner particles were not furnished to the development system, eventually the copies would progressively become lighter and degradate in quality. To this end, a toner dispenser indicated generally by the reference numeral 76 furnishes additional toner particles to chamber 72 of housing 74. Toner dispenser 76 includes a hopper 78 storing a supply of toner particles in chamber 80. The lower end portion of chamber 80 has a circular opening with valve 82 being positioned thereat. As valve 82 rotates, toner particles are dispensed from chamber 80 into a helical auger 84. Helical auger 84 includes a tubular member having a plurality of apertures therein and a helical member. As the helical member rotates, it advances the toner particles dispensed from hopper 80 along the tube. As the toner particles advance along the tube they are dispensed through the apertures therein. A hollow ball or sphere 86, positioned within chamber 80, is periodically agitated as valve 82 rotates to dispense toner particles therefrom. Agitation of sphere 86 prevents the bridging and caking of the toner particles within chamber 80. The level of the toner particles within chamber 80 is preferably no greater than the diameter of sphere 86. This insures that sphere 86 is in continuous contact with valve 82.

Reclaimed toner particles are periodically furnished to hopper 80. These toner particles comprise about 10% to 30% of the toner supply within chamber 80. Additional toner particles are periodically added thereto manually. The detailed structure of the reclamation system will be described hereinafter with reference to FIG. 3. Toner dispenser 76 will be described hereinafter in greater detail with reference to FIGS. 4 through 6, inclusive.

By way of example, elongated magnetic member 68 is cylindrical being made preferably from barium ferrite having a plurality of magnetic poles impressed thereon. Tubular member 66 is made preferably from aluminum having the exterior circumferential surface thereof roughened.

Referring now to FIG. 3, there is shown the detailed structure of the reclamation system. As illustrated thereat, brush 64 contacts photoconductive surface 12 of belt 10. As brush 64 rotates, particles i.e. both toner particles and contaminants, are drawn into brush plenum 88 through tube 90 to separator inlet 92. In separator 94, the dense toner particles are centrifuged to chamber 80 of hopper 78. The cleaned air rises to outlet 96 of separator 94 and through hose 98 to inlet 100 of blower 102. At inlet 100, the air reaches its lowest pressure. Blower 102, which is the system prime mover, raises the air pressure at outlet 104 so that air flows through hose 106 to filter 108 and finally exhausts to the atmosphere. Tube 110 is also coupled to inlet 100 and draws air and some particles from chamber 80 of hopper 78 through tube 114 to bypass filter 112, where particles are separated prior to the ultimate expulsion of the air from the system. Preferably, blower 102 operates at 50 cubic feet per minute at 4 inches of water. By way of example, separator 94 preferably includes a plurality of centrifical separator elements. However, one skilled in the art will appreciate that many other types of separators may be utilized and all such devices which separate contaminates from toner particles may be employed. Preferably, separator 94 is a cyclone separator. A suitable separator is described in U.S. Pat. No. 3,703,957 issued to Swanson et al. in 1972, the relevant portions thereof being thereby incorporated into the present application.

Toner particles in chamber 80 of hopper 78 are periodically agitated as valve 82 rotates. This is due to the random movement of sphere 86 in response to the rotation of valve 82. The agitation or random movement of sphere 86 prevents bridging and caking of the toner particles within chamber 80 of hopper 78. As valve 82 rotates, toner particles are discharged from chamber 80 into helical auger 84. Helical auger 84 extends across chamber 72 of housing 74 (FIG. 2). In this way, toner particles are substantially uniformly discharged across chamber 72 in housing 74. This facilitates the mixing of the toner particles with the de-nuded carrier granules.

Figure 4:
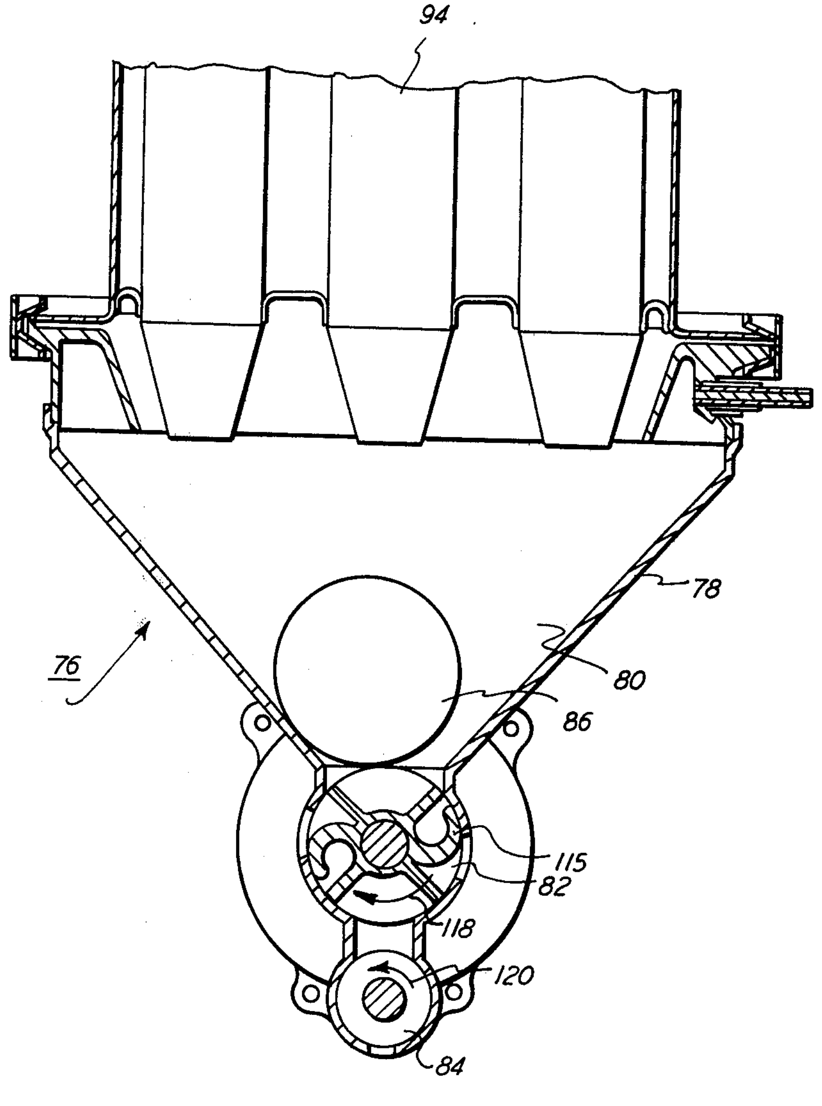
FIG. 4 is a fragmentary, front elevational view of the particle dispenser used in the FIG. 3 reclaiming and dispensing system.

Referring now to FIG. 4, there is shown the detailed structure of toner dispenser 76. As depicted thereat, toner dispenser 76 includes a hopper 78 defining a chamber 80 for storing a supply of toner particles therein. Hollow sphere 86 is positioned within chamber 80. Valve 82, located in the open end of chamber 80 is a substantially cylindrical member having a plurality of depressions therein with at least one of the depressions having an outwardly extending protrusion. The detailed structure of valve 80 will be discussed hereinafter with reference to FIG. 6. The exterior diameter of valve 82 is greater than the circular opening in the lower end of hopper 78. As valve 82 rotates, protrusions 116 engage the side walls of hopper 78 and are deflected thereby. After valve 82 rotates through a discrete angle, successive protrusions 116 are no longer constrained by the walls of hopper 78 and spring free. More particularly, protrusions 116 spring free in chamber 80 of hopper 78 and engage sphere 86. As protrusions 116 spring into contact with sphere 86, they cause sphere 86 to be agitated. The agitation or random movement of sphere 86 prevents bridging and caking of the toner particles within chamber 80 of hopper 78.

Separator 94 is mounted removably in the upper opening of hopper 78. In this way, the machine operator may periodically remove separator 94 from the hopper to furnish additional toner particles to chamber 80. Separator 94 only recycles from about 10% to about 30% of the toner particles required for dispensing. Hence, additional toner particles must be periodically added to chamber 80 of hopper 78 by the machine operator.

As valve 82 rotates in the direction of arrow 118, the depressions therein pass into chamber 80 of hopper 78. In chamber 80, the depressions in valve 116 are filled with toner particles. As valve 118 continues to rotate in the direction of arrow 118, the depressions, which are filled with toner particles, rotate approximately 180° to a position above helical auger 84. The toner particles in the depressions of valve 116 fall under the influence of gravity through a slot in the tube of helical auger 84 onto the helical member disposed therein. As the helical member rotates in the direction of arrow 120, toner particles are advanced along the tube and dispensed through the openings therein into the sump of chamber 72 of housing 74 (FIG. 2). In this way, additional toner particles are periodically furnished to the development system.

Figure 5:
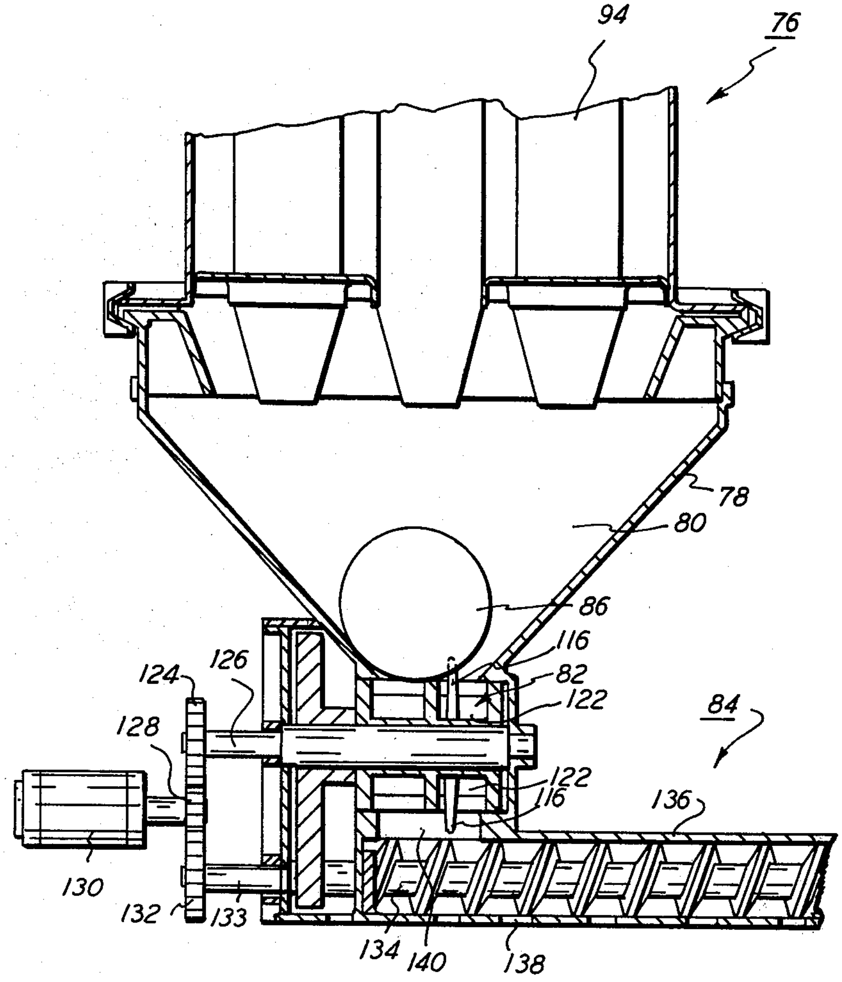
FIG. 5 is a fragmentary, side elevational view of the FIG. 4 particle dispenser.

Referring now to FIG. 5, the detailed structure of the toner dispenser is shown as a side elevational view. As depicted thereat, toner dispenser 76 includes a hopper 78 having separator 94 disposed in the upper opening thereof. Chamber 80 of hopper 78 contains a supply of toner particles therein. Hollow sphere or ball 86 is positioned within chamber 80 of hopper 78. Preferably, sphere 86 is made from a plastic material. Sphere 86 rests, under the influence of gravity, at the lowest point of the funnel shaped hopper 78. In this way, it engages protrusion 116 of valve 82. Protrusion 116 extends outwardly from depression 122. A plurality of depressions are disposed about the periphery of valve 82 which is a substantially cylindrical member. Gear 124 is mounted on shaft 126. Valve 82 is also mounted on shaft 86. Gear 124 is driven by gear 128 which is mounted on the shaft of motor 130. Gear 128 meshes with gear 132 which is mounted on shaft 133 of helical member 134. Helical auger 84 includes a tubular member 136 having helical member 134 disposed interiorly thereon. Tubular member 136 includes a plurality of holes or apertures 138 disposed in the lowermost portion thereof. Slot 140 in tube 136 is positioned beneath valve 82. Hence, as depressions 122 of valve 82 are aligned with slot 140, the toner particles contained therein are dispensed onto helical member 134. As motor 130 drives gear 128, gear 132 which meshes therewith, is also rotated. In this way, helical member 134 advances the toner particles from the region of slot 140 along tube 136. The advancing toner particles are thereby dispensed from tube 136 through openings 138 into chamber 72 of housing 74 (FIG. 2). It is clear that energization of motor 130 controls the movement of valve 82 which, in turn, regulates the dispensing of toner particles into helical auger 84 for subsequent dispensing into chamber 72 of housing 74. Motor 130 is actuated periodically in response to a detecting system determining that the concentration of toner particles within the developer mixture is beneath a predetermined level. A suitable detecting system may comprise a pair of plates through which the developer mixture passes. One of the plates is electrically biased to a potential so as to attract toner particles thereto. The light source transmits light rays through the plate. The intensity of the light rays are detected by a photosensor. Logic circuitry processes the resultant output signal. When the output signal is beneath a pre-determined level, a power source actuates motor 130 so as to rotate valve 86 and helical member 134 for furnishing additional toner particles to chamber 72 of housing 74. A suitable detecting system is disclosed in U.S. Pat. No. 3,682,132 issued to Kamola in 1972, the relevant portions thereof being hereby incorporated into the present application.

Figure 6:
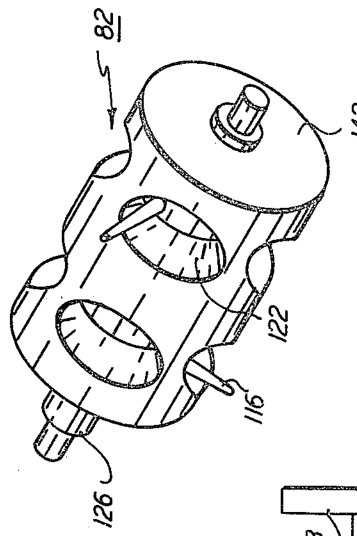
FIG. 6 is a perspective view of the valve used in the particle dispenser shown in FIGS. 4 and 5.

As shown in FIG. 6, valve 82 preferably includes a cylindrical body 142 mounted on shaft 126. Cylindrical member 142 includes a plurality of depressions 122. Protrusions 116 extend outwardly from several of these depressions. Preferably, there are eight depressions 122 and four protrusions 116. Both cylindrical member 142 and protrusions 116 are preferably made from a resilient material such as rubber. Depressions or pockets 122 are designed to fill with toner when in chamber 80 of hopper 78 (FIG. 5). However, as depressions 122 move out of chamber 80, toner particles descend under the influence of gravity into helical auger 84 (FIG. 5). Valve 82 functions as a seal preventing the inadvertent dispensing of toner particles from chamber 80 of hopper 78 and, when actuated, provides a means of metering precise quantities of toner particles therefrom.

In recapitulation, it is clear that the dispensing apparatus of the present invention includes a hopper storing a supply of toner particles therein and a valve metering precise quantities of toner particles therefrom when actuated. A hollow sphere, disposed within the chamber of the hopper, is agitated in response to the valve being actuated. Agitation of the hollow sphere prevents bridging and caking of the toner particles within the chamber of the hopper. In addition to the foregoing, used toner particles are separated from contaminants and recycled back to the hopper. In this manner, the requirement for additional new unused toner particles is minimized.

It is, therefore, evident that there has been provided, in accordance with the present invention, an apparatus for dispensing particles wherein bridging and caking of the toner particles is prevented. This apparatus fully satisfies the aims and advantages hereinbefore set forth. While this invention has been described in conjunction with a specific embodiment thereof, it is evident that many alternatives, modifications and variations will be apparent to those skilled in the art. Accordingly, it is intended to embrace all such alternatives, modifications, and variations as fall within the spirit and broad scope of the appended claims.

What is claimed is:

1. An apparatus for dispensing particles, including:

means, defining an open ended chamber, for storing a supply of particles therein;

a member disposed in the chamber of said storing means; and means, disposed in the open end of the chamber of said storing means, for dispensing particles from the chamber, said dispensing means comprises a rotatably mounted cylindrical member having a plurality of spaced depressions therein, and at least one protrusion extending outwardly from the depression and arranged to periodically engage said member during the rotation of said cylindrical member to agitate said member to prevent the bridging and caking of particles in the chamber of said storing means so as to facilitate the flow of particles from the open end of the chamber of said storing means.

2. An apparatus as recited in claim 1, wherein said member is a hollow sphere.

3. An apparatus as recited in claim 2, wherein said cylindrical member is made from a resilient material.

4. An apparatus as recited in claim 3, wherein said hollow sphere is made from a plastic material.

5. An apparatus as recited in claim 3, wherein said protrusion engages a wall of said storing means to bend during the rotation of said cylindrical member and to be released thereby during the movement thereof into the chamber of said storing means so as to flick said hollow sphere causing agitation thereof.

6. An apparatus as recited in claim 5, wherein the open end of the chamber or said storing means is substantially circular with the free end region of said protrusion extending outwardly beyond said cylindrical member and in engagement with the walls of the open end of said chamber to be bent thereby and to be released from contact therewith as said cylindrical member rotates said protrusion into and out of the chamber of said storing means.

7. An apparatus as recited in claim 6, further including means for rotating said cylindrical member.

8. An apparatus as recited in claim 2, further including means for furnishing particles to said storing means.

9. An apparatus as recited in claim 8, further including means, positioned to receive the particles dispensed from said dispensing means, for advancing the particles discharged therefrom.

10. An electrophotographic printing machine of the type having a development system for depositing particles on an electrostatic latent image recorded on a photoconductive member, wherein the improvement includes:

- means, defining an open ended chamber, for storing a supply of particles therein;
- a member disposed in the chamber of said storing means; and
- means, disposed in the open end of said storing means, for dispensing particles from the chamber to the development system, said dispensing means comprises a rotatably mounted cylindrical member having a plurality of spaced depressions therein, and at least one protrusion extending outwardly from depression and arranged to periodically engage said member during the rotation of said cylindrical member to agitate said member to prevent the bridging and caking of particles in the chamber of said storing means so as to facilitate the flow of particles from the open end of the chamber of said storing means to the development system.

11. A printing machine as recited in claim 10, wherein said member is a hollow sphere.

12. A printing machine as recited in claim 11, wherein said cylindrical member is made from a resilient material.

13. A printing machine as recited in claim 12, wherein said hollow sphere is made from a plastic material.

14. A printing machine as recited in claim 12, wherein said protrusion engages a wall of said storing means to bend during the rotation of said cylindrical member and to be released thereby during the movement thereof into the chamber of said storing means so as to flick said hollow sphere causing agitation thereof.

15. A printing machine as recited in claim 14, wherein the open end of the chamber of said storing means is substantially circular with the free end region of said protrusion extending outwardly beyond said cylindrical member and in engagement with the walls of this open end of said chamber to be bent thereby and to be released from contact therewith as said cylindrical member rotates said protrusion into and out of the chamber of said storing means.

16. A printing machine as recited in claim 14, further including means for rotating said cylindrical member.

17. A printing machine as recited in claim 11, further including means for furnishing particles to said storing means.

18. A printing machine as recited in claim 17, wherein said furnishing means includes:

- means for removing un-used particles and contaminants from the photoconductive member;
- means for separating the removed particles from the contaminants to obtain substantially contaminant free particles; and
- means for returning the contaminant free particles to said storing means.

19. A printing machine as recited in claim 18, further including means, positioned to receive the particles dispensed from said dispensing means, for advancing the particles discharged therefrom.

20. A printing machine as recited in claim 19, wherein said advancing means includes:

- a tubular member having a plurality of apertures therein and extending across the development system; and
- a helical auger disposed interiorly of said tubular member for moving the particles along said tubular member to be discharged from the apertures therein to the development system.

* * * * *